Figure 6:
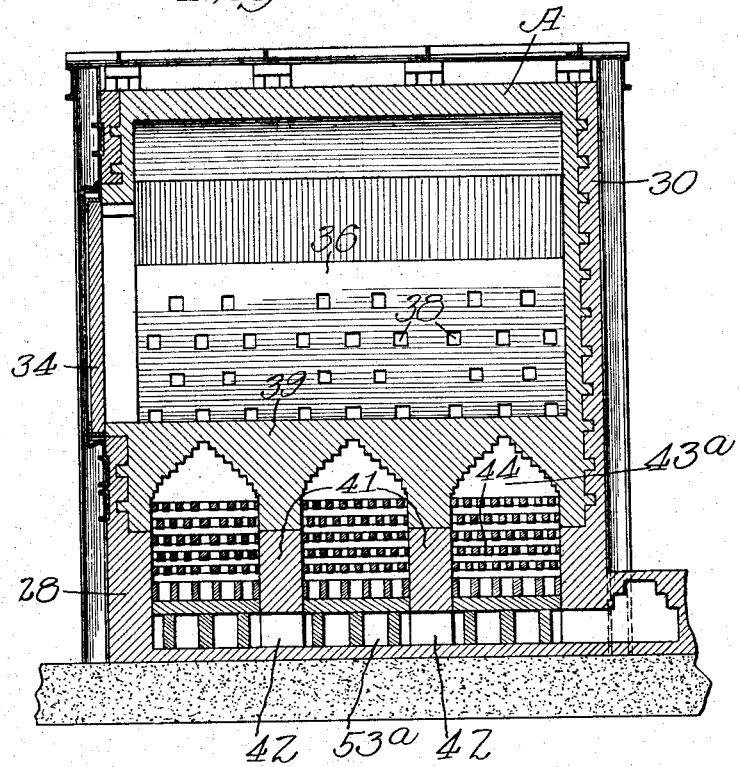

A. L. STEVENS.
CERAMIC KILN.
APPLICATION FILED SEPT. 10, 1912.
1,223,440.
Patented Apr. 24, 1917.
6 SHEETS—SHEET 1.
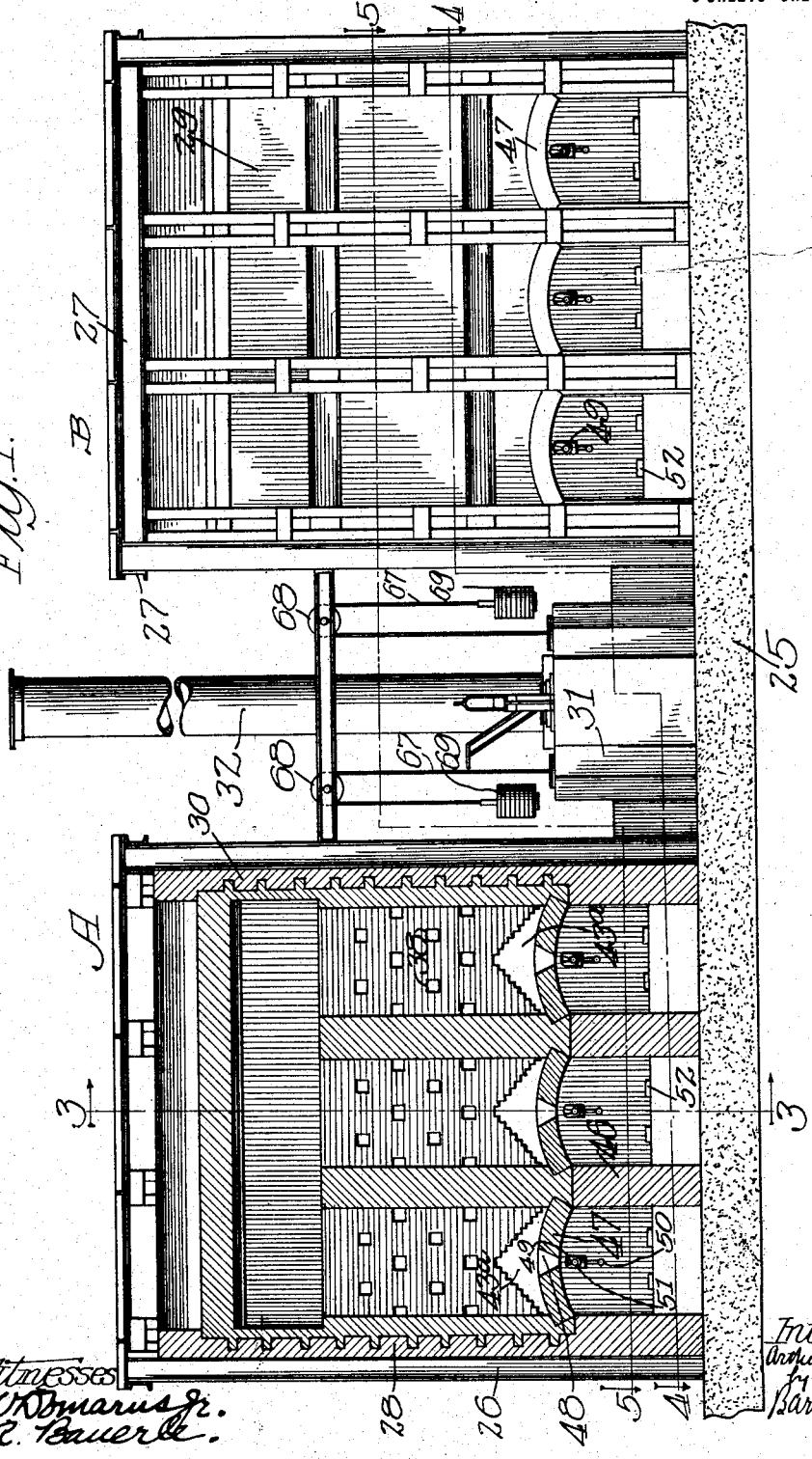

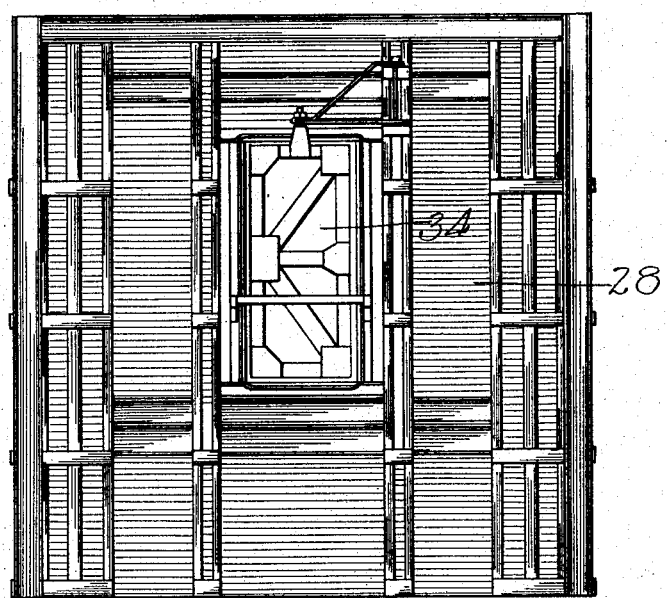
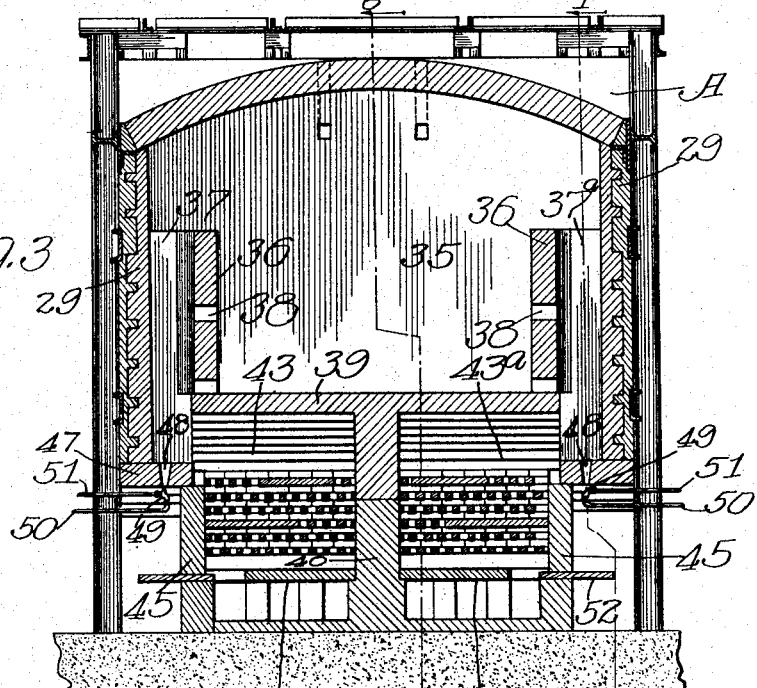

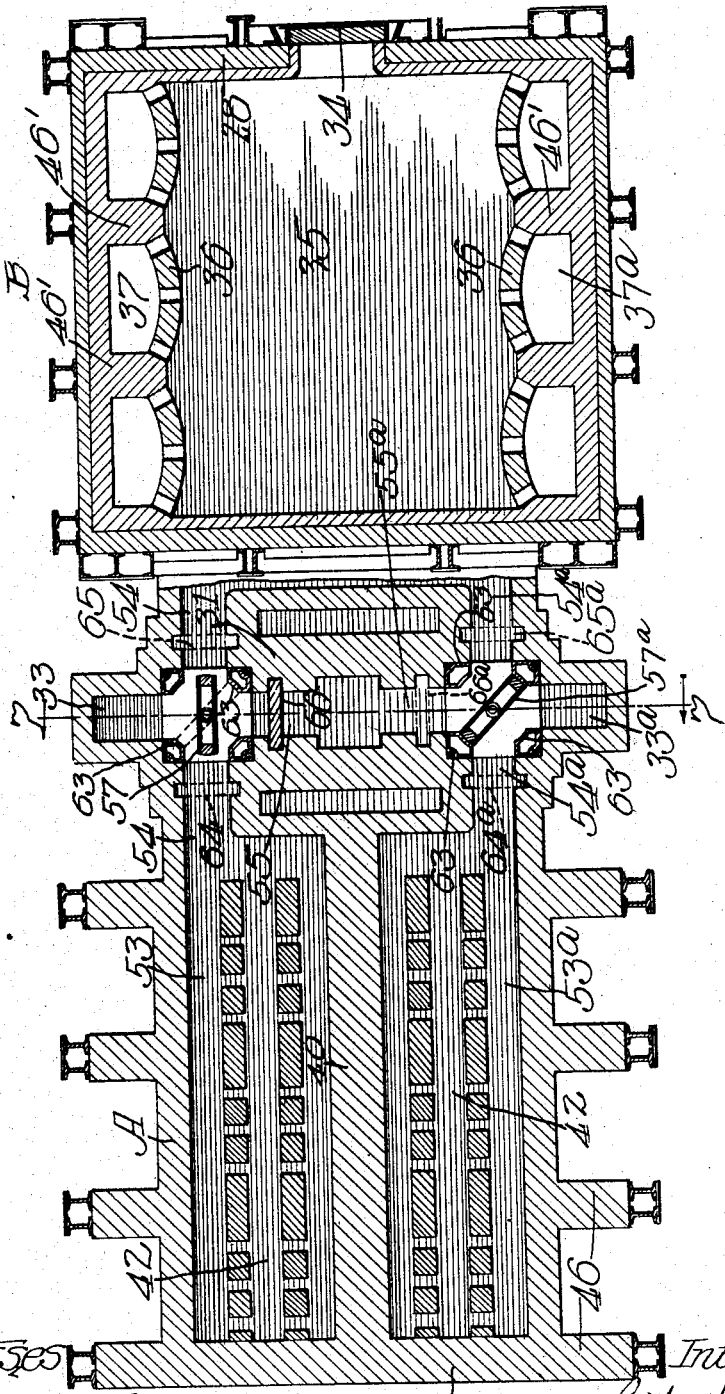

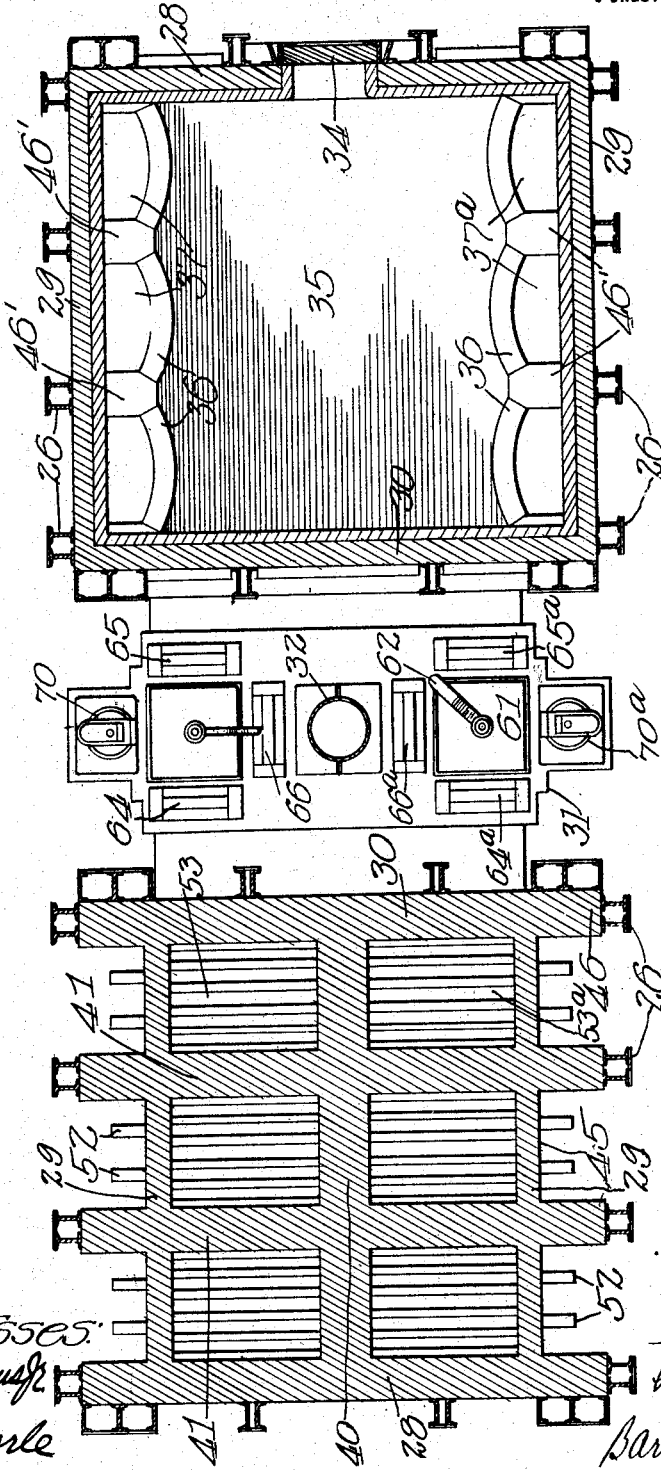

A. L. STEVENS.
CERAMIC KILN.
APPLICATION FILED SEPT. 10, 1912.

1,223,440.

Patented Apr. 24, 1917.
6 SHEETS—SHEET 5.

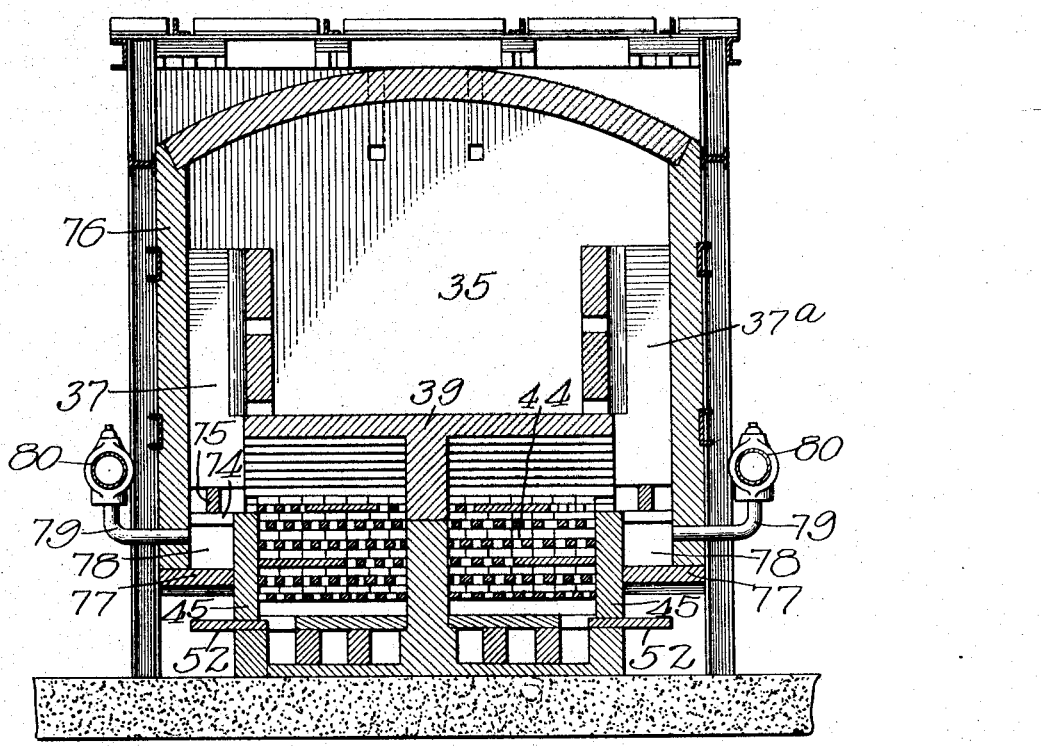

UNITED STATES PATENT OFFICE.

ARTHUR L. STEVENS, OF CHICAGO, ILLINOIS.

CERAMIC KILN.

1,223,440.

Specification of Letters Patent.

Patented Apr. 24, 1917.

Application filed September 10, 1912. Serial No. 719,526.

*To all whom it may concern:*

Be it known that I, ARTHUR L. STEVENS, a citizen of the United States, residing at Chicago, in the county of Cook and State of Illinois, have invented certain new and useful Improvements in Ceramic Kilns, of which the following is a specification.

My invention relates to the construction of furnaces or kilns, and one of the principal objects of the invention is to provide a kiln of the regenerative type, adapted particularly for firing pottery, tiles, or other ceramic wares, which will be superior in several respects to the ceramic kilns heretofore used. The improvements consist, among other features, in certain novel constructions and arrangements to be hereinafter more fully described by means of which the firing chamber may be heated uniformly throughout and may be gradually heated up and gradually cooled down more certainly and conveniently than with kilns previously known, whereby an economy in fuel may be effected; and whereby, furthermore, the kiln is structurally more compact than former kilns of the regenerative type.

A further object of the invention is to save the heat which ordinarily goes to waste when a kiln is cooled down after a batch of the ware has been fired by providing an arrangement of two kilns, or a kiln having two firing chambers, as the structure may be regarded, each of which kilns or chambers, when, or preferably before, the firing is started up, is adapted to receive the heat stored in the other chamber of the kiln and its regenerator, if the furnace is of the regenerative type, during a previous firing operation.

The invention has for a further object to provide a kiln for treating ceramic ware or for other similar purposes, having the new and improved features of construction and design, and consisting of the novel devices, constructions and arrangements which are shown in the drawings annexed hereto and will be hereinafter more fully described and claimed.

The invention is illustrated, in a preferred embodiment, in the accompanying drawings, wherein—

Figure 7:
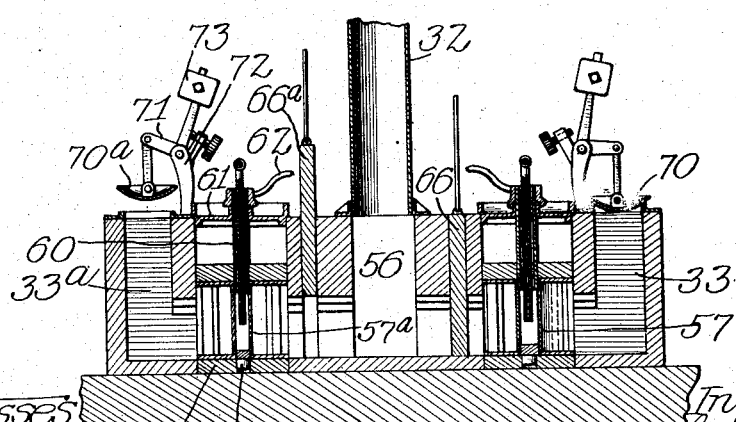

Figure 1 is a side elevation of a double kiln constructed in accordance with my invention, the left hand end of the figure being a vertical section taken on line 1—1 of Fig. 3;

Fig. 2, a front elevation;

Fig. 3, a vertical sectional view taken on line 3—3 of Fig. 1, looking in the direction of the arrows;

Figs. 4 and 5, sectional plans taken on lines 4—4 and 5—5, respectively, of Fig. 1;

Fig. 6, a fragmentary sectional view taken on line 6—6 of Fig. 3, looking in the direction of the arrows;

Fig. 7, a vertical sectional view taken on line 7—7 of Fig. 4, looking in the direction of the arrows; and Fig. 8 is a sectional view illustrating a modification.

Like characters of reference designate like parts in the several figures of the drawings.

The drawings, as will be observed, show two kilns adapted to be connected one with the other for the purpose above noted. One of these structures is designated A and the other B. They are exactly alike except that, being placed back to back, the arrangements in one structure are reversed with respect to the other. While one of the objects of my invention has been to provide a duplex kiln of this sort, it will be obvious from the following description that certain of the improvements here concerned might be utilized to advantage in a single kiln or kiln having a single firing chamber. I desire to claim as my invention both the double structure and also such features of the single structures as may be novel.

With reference to the following description, it is noted that the same reference characters are used to designate corresponding parts of the two structures A and B.

Referring to the drawings, the structure is built upon a suitable foundation or base such as the concrete base 25, and consists of fire brick walls reinforced and supported by the upright I-beams 26 and the transverse I-beams 27 or other suitable steel structure. 28 designates the front wall of each of the furnaces or kilns, 29 the side walls, and 30 the back walls. A brick structure 31 intervenes between the back walls and provides the flues for connecting the furnaces together and for connecting the regenerators with the fresh air inlets and with the stack. 32 designates the stack and 33, 33ᵃ a pair of fresh air intakes one on each side of the stack. The front wall of each furnace is provided with the door 34 which opens into the firing chamber 35. On the opposite sides of the firing chamber are the bridge walls or bag walls 36 spaced away from the sides of the kiln so as to provide flues 37, 37ᵃ. The floor 39 of the firing chamber is supported upon the end walls of the kiln, a central longitudinal wall 40 and the transverse walls 41. The wall 40 extends from the ground up to the floor. The transverse walls 41 are formed at the bottom with longitudinal openings 42 so that the spaces 43 on one side of the central wall 40 communicate with each other. The same is true of the spaces 43ᵃ on the other side of wall 40. These communicating spaces are filled with checker-work 44 and constitute regenerators. The regenerator 43 communicates with the flue 37 and the regenerator 43ᵃ on the other side of the kiln with the flue 37ᵃ. The lower portions of the side walls of the kiln are inset as indicated at 45 (Figs. 3 and 4), the upper part of the walls being supported on the buttresses 46. The bag walls are made up of a series of inwardly arched walls arranged between the piers 46′ which are extensions of the piers or buttresses 46. The walls 36 are pierced with openings 38 to equalize the temperature of the firing chamber. These walls are given the curved or arched construction shown in order to support the weight of the material charged into the kiln which is usually piled up against these walls and which, through its shrinkage from burning, often shifts its weight to either side of the kiln. Between the buttresses are arranged arches 47 formed with flaring openings 48 beneath which are disposed burners for heating the air which enters the flues 37, 37ᵃ from the regenerators 43, 43ᵃ. 49 designates, in each case, the burner which is supplied with oil through the pipe 50 and air through the pipe 51. The construction of the burner is not shown in detail as it forms no part of my present invention. The burner is shown, described and claimed in my co-pending application Serial No. 719,532, filed September 10, 1912. In order to control the passage of air and gases from the regenerators to the firing chamber, and in the opposite direction, for the purpose particularly of maintaining an equal temperature from end to end of the firing chamber, I provide dampers 52 which slide through suitably formed slots in the walls 45 so as to intercept more or less of the air entering the checker-work of the regenerators from the spaces or flues 53, 53ᵃ below the same. Flues 54, 54ᵃ connect the spaces 53, 53ᵃ of one kiln with the corresponding spaces in the other kiln. Flues 55, 55ᵃ lead from the flues 54, 54ᵃ to the uptake flue 56 communicating with the stack 32. These flues are continued outwardly so that they communicate with the fresh air intakes 33, 33ᵃ.

The flues and passageways connecting the several regenerators with each other, with the stack and with the air inlets, are provided with certain valves and dampers which, in the first place, permit one of the kilns, A or B, to be used independently of the other, and in such case allow the hot gases to be circulated across the kiln from side to side alternately in opposite directions; and, in the second place, permit the two kilns to be used in conjunction so that when, preferably, before one is fired up it receives the heat given off by the cooling down of the other. A preferred arrangement of valves having these purposes in view will be described next.

57. 57ᵃ designate water-cooled butterfly valves pivoted at the intersection of flues 54, 55 and 54ᵃ, 55ᵃ. These valves are just alike so that only one need be described. The valve has a pivot 58 turning in a socket in the base plate 59 and is provided also with a stem 60 passing through the top plates 61 and provided with the handle 62. Four seats, 63, are provided. The valve may be turned so as to stand diagonally between pairs of these seats, or it may stand in an open position as indicated at the upper part of Fig. 4. The arrangement for water-cooling the valve and its seats need not be described herein as the specific construction of the valve is made the subject-matter of my pending application, Serial No. 719,531, filed September 10, 1912. Slide valves 64, 65, 64ᵃ, 65ᵃ are arranged in the flues 54, 54ᵃ, respectively, at opposite sides of the valves 57, 57ᵃ. Similar slide valves 66, 66ᵃ intervene in flues 55, 55ᵃ between the valves and the stack. These valves may be alike in their construction. Preferably they consist of fire brick slabs supported on cables 67 extending over pulleys 68, the opposite ends of the cables being provided with the counterbalancing weights 69 (see Figs. 1 and 7). The fresh air intakes 33, 33ᵃ are provided with suitable valves. I have shown valve 70, 70ᵃ (Fig. 7) hung in each case from a bell crank 71 pivoted on a standard 72, the other arm of the bell crank being loaded with the weight 73.

The operation of the apparatus above described is as follows:

When one of the kilns, say kiln A, is operated independently of the other kiln, the slide valves 64, 64ᵃ are opened and the slide valves 65, 65ᵃ closed. The slide valves 66, 66ᵃ are both opened. Supposing that the firing is done first at the side of the kiln in which flue 37ᵃ is located, the fresh air intake 33ᵃ will be opened and the other fresh air inlet 33 closed. Valve 57 will be turned to the dotted line position (Fig. 4) which puts the flue 54 leading from regenerator 53 in communication with the stack; the slide valve 66 being opened instead of being in the position shown in Fig. 4. The valve 57ᵃ is turned to the position it is shown as occupying in Fig. 4 which puts the flue 54ª in communication with the air intake 33ª. The fresh air entering intake 33ª passes up through the regenerator 53ª and into flue 37ª where it is mixed with the hot gases from the burners on this side of the kiln. The burners on the other side are closed. The hot gases in the flue 37ª pass over the top of the bridge wall 36 and pass out of the firing chamber through the flue 37 into the regenerator 43. Some parts of the hot gases in the flue 37ª enter the firing chamber through the openings 38 of bridge wall 36 and pass out through the corresponding openings in the bridge wall 36 so as to equalize the temperature of the chamber. It will be understood that the pottery or other ceramic ware is piled up in the firing chamber between the bridge walls. From the regenerator 43 the air or gases are drawn down by the stack draft into the space 53 and from there through flues 54 and 55 to the stack. After a time the positions of valves 57, 57ª are reversed and the furnace fired on the other side. The fresh air now passes through the regenerator 43 before entering the firing chamber and is heated up by the heat stored in the checker-work during the previous operation when the hot gases from the firing chamber were discharged through this regenerator. It will be understood that the circulation through the kiln will be thus reversed at suitable intervals until the firing of the ware is finished. The division of this combustion space between the bag walls and the sides of the kiln into separate flues and the use of the dampers 52 to vary the passage of air and gases between the regenerator and the firing chamber make it possible to heat the kiln uniformly from end to end. Short-circuiting of the circulation through one end of the furnace is avoided.

If the two kilns, A and B, are used in conjunction the kiln B is charged with green ware, which of course is very moist, while the charge in the furnace A is being burned. It is desirable that the kiln containing the batch of fresh moist ware should be heated up gradually. It is also desirable that the other kiln should be cooled down slowly. By using the two kilns A and B, one in connection with the other, in the manner to be described, these desirable results are attained and also the heat given off by the cooling kilns is utilized instead of being wasted as has been the case heretofore. Supposing kiln B freshly charged and the firing operation in kiln A completed, the burners of kiln A are shut off, the slide valves 64ª, 65ª, are opened and the slide valve 66 closed. Valve 57 is turned to its open position and valve 57ª to a position which puts the flue 54ª in communication with the air inlet 33ª, the latter being open and the other air intake 33 being closed. In other words, the valves are in the positions shown in Figs. 4 and 7. Fresh air entering intake 33ª passes up through the regenerator 43ª of the kiln A through the firing chamber and down into regenerator 43 and thence through flue 54 into the firing chamber of kiln B through the flues 37 (Fig. 4). The air in passing through the regenerators and through the firing chamber of kiln A absorbs a considerable amount of heat which, of course, is utilized to heat up kiln B and its contents. In order that the kiln A should be cooled down gradually and equally on both sides and that the kiln B should be heated in like manner, the circulation through each kiln and its regenerator is reversed. This is done by reversing the positions of valves 57, 57ª, 66 66ª and 70, 70ª. The fresh air entering through intake 33 passes through the kiln A and its regenerators before going to kiln B but it goes through A in the opposite direction and enters kiln B on the opposite side, namely, through the flues 37ª. The circulation may thus be periodically reversed until enough heat has been transferred from kiln A to kiln B to substantially equalize the temperatures in the two kilns. The burners of kiln B will then be lighted. If desired, the air supply going to kiln B may still be taken in through kiln A and its regenerators so as to further cool down the latter kiln before it is unsealed and utilize to the fullest extent the heat stored therein.

It will be understood that while kiln B is firing kiln A may be opened, its contents removed and the kiln recharged with fresh material, sealed up, and preheated by the heat stored in the kiln B during the firing of that kiln in the manner above described. In this way the firing process may be a substantially continuous one, each kiln being preheated by heat taken from the other and being fired while the completely fired ware is removed from the other kiln and the latter kiln recharged.

In Fig. 8 I have shown a slight modification in the construction of the furnace necessary to accommodate the same for the consumption of gas as a fuel instead of oil. The arches 49 are removed and transversely arranged bricks 74, 75 are placed across the spaces between the inner side walls 45 and the outer side walls, here designated 76, which are continued down and supported upon arches 77. This construction forms a number of spaces 78 into which lead the branch pipes 79 from the gas main 80.

While I have described my invention in certain preferred embodiments, it will be readily understood that modifications might be made without departing from the principles of the invention. Therefore I do not wish to be understood as limiting the invention to the particulars described and claimed.

I claim:

1. In a kiln for ceramic ware, or the like, the combination with means constituting a firing chamber having a continuous series of bag walls and flues extending the full length of each side thereof, of a regenerator communicating with each of said series of flues, and means whereby hot gases may be introduced into said chamber from said regenerators alternately through the flues on opposite sides of the chamber, and, in each case, discharged through the flues on the side opposite to that through which they entered into the regenerator communicating with said last named flues.

2. In a kiln for ceramic ware, or the like, the combination with means constituting a firing chamber having a bag wall and flue at each side thereof, of a regenerator communicating with each of said flues, said regenerators being located directly under said firing chamber, and means whereby hot gases may be introduced into said chamber from said regenerators alternately through the flues on opposite sides of the chamber, and, in each case, discharged through the flue on the side opposite to that through which they entered into the regenerator communicating with said last named flue.

3. In a kiln for ceramic ware, or the like, the combination with means constituting a firing chamber having a continuous series of bag walls and flues extending the full length of each side thereof, through which hot gases are introduced into said chamber alternately, of a regenerator communicating with each of said series of flues and provided with a fresh air intake and a discharge passageway, and means whereby said regenerators may be put into communication, one with the fresh air intake and the other with said discharge passageway.

4. In a kiln for ceramic ware, or the like, the combination with means constituting a firing chamber having a continuous series of bag walls and flues extending the full length of each side thereof, of a regenerator communicating with each of said series of flues and provided with a fresh air intake and a discharge passageway, means whereby said regenerators may be put into communication, one with the fresh air intake and the other with said discharge passageway, and means for varying the amount of air passing from said regenerators to the firing chamber.

5. In a kiln for ceramic ware, or the like, the combination with means constituting a firing chamber having a continuous series of bag walls and flues extending the full length of each side thereof, of a regenerator communicating with each of said series of flues and provided with a fresh air intake and a discharge passageway, means whereby said regenerators may be put into communication, one with the fresh air intake and the other with said discharge passageway, and burners located adjacent the lower ends of said flues.

6. In a kiln for ceramic ware, or the like, the combination with means constituting a firing chamber having a bag wall and flue at each side thereof, of a regenerator communicating with each of said flues, said regenerators being located directly under the floor of said firing chamber and being provided, in each case, with a fresh air intake and a discharge passageway, and means whereby said regenerators may be alternately put into communication, one with the fresh air intake and the other with the discharge passageway, said flues being formed with openings, and burners located under said openings.

7. In a kiln for ceramic ware, or the like, the combination with means constituting a firing chamber having a bag wall and flue at each side thereof, of a regenerator communicating with each of said flues, a fresh air intake for each of said regenerators, a stack between said fresh air intakes, and valves adapted to put said regenerators in communication with either the air intakes or said stack.

8. In a kiln for ceramic ware, or the like, the combination with means constituting a firing chamber, of regenerators communicating with said firing chamber throughout its length at opposite sides, air intakes, one for each regenerator, a stack located between said intakes, a valve casing for each regenerator communicating, in each case, with one of the intakes and with the stack and formed with four seats, and a revoluble valve in each casing adapted, in one position, to put the regenerator in communication with its air intake, closing communication with the stack, and in another position to put said regenerator in communication with said stack, closing communication between the regenerator and the intake.

9. In a kiln for ceramic ware, or the like, the combination with means constituting a firing chamber, of a continuous series of bag walls extending the full length of opposite sides of said chamber providing flues, through which hot gases are alternately introduced into said chamber, regenerators communicating with each series of flues, air intakes, one for each regenerator, a stack located between said intakes, a valve casing for each regenerator communicating in each case with one of the intakes and with the stack and formed with four seats, and a revoluble valve in each casing adapted, in one position, to put the regenerator in communication with its air intake, closing communication with the stack, and in another position, to put said regenerator in communication with said stack, closing communication between the regenerators and the intake.

10. In a kiln, the combination of means constituting two separate firing chambers, regenerators communicating with said chambers, and means whereby hot gases may be caused to pass from either chamber to the other through said regenerators.

11. In a kiln, the combination of means constituting two separate firing chambers, regenerators communicating with said chambers, and means whereby fresh air may be taken into the regenerators communicating with each of said chambers alternately and caused to pass through said chambers successively, and whereby the gases from the other chamber may be discharged through the regenerators communicating with said chamber.

12. In a kiln, the combination with means constituting two separate firing chambers, of regenerators connected with each of said chambers, a stack, air intakes for said regenerators, means for opening and closing communication between the regenerators connected with the two chambers, and means for opening and closing communication between the regenerators and the stack and the regenerators and said fresh air intakes.

13. In a kiln for ceramic ware, or the like, the combination with means constituting two separate firing chambers, of a pair of regenerators for each chamber communicating with the chamber at opposite sides, a stack, air intakes, flues connecting the regenerators on corresponding sides of said chambers, flues connecting said regenerators with said stack and air intakes, and valves for said flues whereby fresh air may be taken into one of the regenerators of either chamber and caused to pass through the chambers and their regenerators successively and discharged into the stack from one of the regenerators of the other chamber other than that first traversed.

14. In a kiln for ceramic ware, or the like, the combination with means constituting two separate firing chambers, of a pair of regenerators for each chamber communicating with the chamber at opposite sides, a pair of air intakes between said chambers, a stack arranged between said intakes, a flue connecting the air intakes and stack, flues connecting the regenerators on corresponding sides of said chambers, which flues intersect the last mentioned flue, valve casings interposed at the intersections of said flues having, in each case, two pairs of diagonally arranged seats, and a revoluble valve in each casing.

15. In a kiln for ceramic ware, or the like, the combination with means constituting two separate firing chambers, of a pair of regenerators for each chamber communicating with the chamber at opposite sides, a pair of air intakes between said chambers, a stack arranged between said intakes, a flue connecting the air intakes and stack, flues connecting the regenerators on corresponding sides of said chambers, which flues intersect the last mentioned flue, valve casings interposed at the intersections of said flues having, in each case, two pairs of diagonally arranged seats, a revoluble valve in each casing, and additional valves for closing communication between the regenerators and the valve casings on corresponding sides of the kiln and valves for closing communication between the valve casings and the stack.

16. In a kiln for ceramic ware, or the like, the combination with means constituting two separate firing chambers, of a pair of regenerators for each chamber, and means for introducing fresh air into either regenerator of either chamber and causing the same to be circulated through the chambers successively, and their respective regenerators, and discharged from one of the regenerators connected with the chamber last traversed.

17. In a kiln for ceramic ware, or the like, the combination with means constituting two separate firing chambers, of a pair of regenerators for each chamber, bag walls on opposite sides of said chambers providing flues which severally communicate with said regenerators, and means for introducing fresh air into either regenerator of either chamber and causing the same to be circulated through the chambers successively, and their respective regenerators, and discharged from one of the regenerators connected with the chamber last traversed.

18. In a kiln of the character described, the combination with means constituting a firing chamber, of a continuous series of arcuate bag walls extending the full length of each side of said chamber, transverse walls which divide the spaces between said bag walls and the side walls of the chamber into several vertically extending flues, and means for causing the heating agent to pass across said chamber alternately in opposite directions through said flues.

19. In a kiln of the character described, the combination with means constituting a firing chamber, of arcuate bag walls extending the full length of each side of the chamber, transverse walls which divide the spaces between the bag walls and the side walls of the chamber into several vertically extending flues, flues on each side of the kiln extending under and communicating with said vertical flues, means for introducing hot gases into said chamber alternately through the flues on opposite sides thereof, and means for equalizing the inflow and outflow through said vertical flues.

20. In a kiln, the combination of means constituting two separate firing chambers, regenerators communicating with said chambers, and means whereby hot gases may be caused to flow from either chamber to the other through said regenerators, said means being operable to isolate one of said chambers and to cause hot gases to pass through the other chamber and said regenerators alternately in opposed directions.

21. In a kiln, the combination of means constituting two separate firing chambers, regenerators communicating with said chambers, and means whereby fresh air may be taken into the regenerators communicating with one of said chambers alternately and caused to pass through both chambers successively, whereby the gases from the other chamber may be discharged through the regenerators communicating with it, said means being operable to isolate one of said chambers and to cause fresh air to pass through the other chamber, and regenerators communicating with it alternately in opposed directions.

22. In a kiln, the combination with means constituting two separate firing chambers, of regenerators for each of said chambers, a stack, air intakes for said regenerators and means whereby hot gases may be caused to pass from one of said air intakes successively through one set of regenerators, one chamber, the other set of regenerators, the other chamber, and said stack; said means being operable to isolate one of said chambers and to cause hot gases to pass through the other chamber and said regenerators alternately in opposed directions.

ARTHUR L. STEVENS.

Witnesses:
L. A. FALKENBERG,
R. C. THORESON.

Copies of this patent may be obtained for five cents each, by addressing the "Commissioner of Patents, Washington, D. C."

Corrections in Letters Patent No. 1,223,440.

It is hereby certified that in Letters Patent No. 1,223,440, granted April 24, 1917, upon the application of Arthur L. Stevens, of Chicago, Illinois, for an improvement in "Ceramic Kilns," errors appear in the printed specification requiring correction as follows: Page 4, lines 87–88, claim 7, strike out the words "bag wall and flue at" and insert the words *continuous series of bag walls and flues extending the full length of;* same page and claim, line 89, before the word "flues" insert the words *series of;* and that the said Letters Patent should be read with these corrections therein that the same may conform to the record of the case in the Patent Office.

Signed and sealed this 5th day of June, A. D., 1917.

[SEAL.] F. W. H. CLAY,

*Acting ommissioner of Patents.*

Cl. 25–145.